Feb. 17, 1970 A. H. MacPHERSON 3,496,479

STABLE, REAL TIME, FREQUENCY INVERSE FILTERING SYSTEM AND METHOD

Filed July 3, 1967 2 Sheets-Sheet 1

INVENTOR
A. H. MAC PHERSON
BY C. E. Hirsch Jr.
ATTORNEY

United States Patent Office 3,496,479

Patented Feb. 17, 1970

3,496,479

STABLE, REAL TIME, FREQUENCY INVERSE FILTERING SYSTEM AND METHOD

Alan H. MacPherson, New Providence, N.J., assignor to Bell Telephone Laboratories, Incorporated, Murray Hill, N.J., a corporation of New York Filed July 3, 1967, Ser. No. 650,695
Int. Cl. H04b *15/00;* H03k *5/00*
U.S. Cl. 328—167 7 Claims

ABSTRACT OF THE DISCLOSURE

A replica of an input signal to a transmission channel characterized by a non-minimum phase transfer function is obtained by this invention. The signal received from the transmission channel is passed through a first filter whose characteristics are the frequency inverse of those of the minimum phase component of the transfer function. Then, a time-compressed, time-reversed version of the resulting filtered signal, obtained by inserting coded samples of this filtered signal into a recirculating delay line and then continuously reading them out, is passed continuously through a second filter whose characteristics are those of a frequency-scaled version of the all-pass component of the non-minimum phase transfer function. Sampling the output signal from this second filter at a selected rate and filtering the resulting samples yields, in real time, the replica of the input signal to the transmission channel.

BACKGROUND OF THE INVENTION

This invention relates to signal processing, and, in particular, to the processing of signals transmitted through transmission channels characterized by non-minimum phase transfer functions.

In a multipath transmission medium, such as a room, or sound stage, a transmitted signal reaches a receiver via several paths. The result is a "reverberant signal." Often, the reverberations are such that the received version of the original signal is of poor quality.

One technique for removing the reverberations from the received signal is called frequency inverse filtering. The received signal is passed through a filter whose phase and amplitude characteristics are the inverse of those of the transmission channel. Ideally, the output signal from the filter is a replica of the input signal to the transmission channel. However, as disclosed by J. L. Flanagan et al. in patent application Ser. No. 631,757, filed Apr. 18, 1967, and assigned to Bell Telephone Laboratories, assignee of this invention, not all frequency inverse filters are stable. In particular, when the transmission channel is characterized by a non-minimum phase transfer function—that is, a transfer function whose numerator goes to zero for selected values of complex frequency in the right-half complex $s$-plane—the corresponding frequency inverse filter is unstable.

Flanagan et al. disclose a technique for obtaining a replica of the original signal which avoids the use of an unstable frequency inverse filter. First, they pass the received signal through a filter whose characteristics are the frequency inverse of those of the minimum phase component of the non-minimum phase transfer function of the transmission channel. Then, they record the resulting signal and play it backwards through a filter whose characteristics are those of the all-pass component of the transfer function of the transmission channel. Finally, they record and play backwards the signal resulting from this second filtering to yield the desired reverberation-free transmitted signal.

Unfortunately, the processing technique disclosed by Flanagan et al. requires two recording steps; one to record the first filtered version of the received signal so that this signal can be played backwards, and a second to record the second filtered signal so that this signal can also be played backwards. In addition, two tapes are needed to monitor continuously a single transmission channel; one tape to record the signals on the transmission channel while a second tape is being processed. This is cumbersome. Finally, a received signal is not detected until the tape on which it is recorded is processed. This can cause unacceptable delays between the reception and detection of a signal.

SUMMARY OF THE INVENTION

This invention overcomes these limitations of the Flanagan et al. system by providing, after a short initial delay, continuous real time processing of the received signal. As a result of this invention, signals transmitted over transmission channels characterized by non-minimum phase transfer functions can be continuously and stably processed to yield an essentially real time replica of the original transmitted signal.

According to this invention, the received signal is passed continuously through a filter whose characteristics are the frequency inverse of those of the minimum phase component of the transfer function of the transmission channel. Then, the resulting filtered signal is sampled and encoded. Each encoded sample is inserted into a recirculating delay line just before the preceding sample inserted into the delay line passes the insertion point for the first time. As a result, the recirculating delay line contains, at any instant after an initial start transient, encoded samples representing a time-compressed, time-reversed version of the last $\tau$ seconds of the filtered signal. These encoded samples are continuously and nondestructively read out from the recirculating delay line, decoded, and used to reconstruct a time-compressed, time-reversed analog version of the last $\tau$ seconds of the filtered signal. This time-reversed, time-compressed analog signal is then passed through a filter whose characteristics are those of a frequency scaled version of the all-pass component of the transfer function of the transmission channel. The resulting filtered signal represents a time-reversed, time-compressed version of the last $\tau$ seconds of the transmitted signal. According to this invention, a replica of the transmitted signal is obtained by sampling this time-reversed, time-compressed version at the same rate as the output signal from the first filter is sampled. The resulting sequence of samples, when passed through an appropriate filter, yields a replica of the transmitted signal.

This invention may be more fully understood from the following detailed description taken together with the drawings.

Theory

Figure 2:
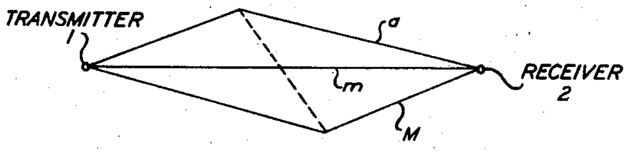
FIG. 2 is a schematic representation of a multipath transmission channel between a transmitter and a receiver.

FIG. 2 shows schematically a multipath transmission channel, represented by lines $a$ to M linking transmitter 1 to receiver 2. M is an integer equal to the number of paths in the channel.

Figure 1A:
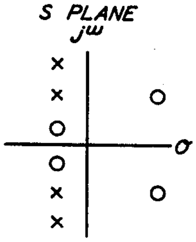
FIG. 1A shows in the complex $s$-plane the poles and zeros of the non-minimum phase transfer function of a hypothetical multipath transmission channel.
Figure 1B:
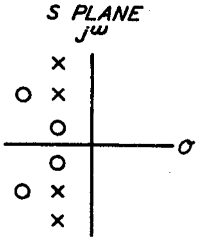
FIG. 1B shows in the complex $s$-plane the poles and zeros of the minimum phase component of this transfer function.
Figure 1C:
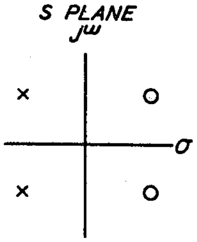
FIG. 1C shows in the complex $s$-plane the poles and zeros of the all-pass component of this transfer function.

Non-minimum phase transfer function $H(s)$ represents the frequency characteristics of this multipath transmission channel. As shown hypothetically in FIG. 1A, this transfer function contains zeros, represented by "0," in the right-half complex $s$-plane. In general, $H(s)$ contains a minimum phase component $H_m(s)$, the zeros and poles of which are shown in FIG. 1B, and an all-pass component $H_{ap}(s)$, the symmetrically arranged zeros and poles of which are shown in FIG. 1C.

A transmitted signal, represented in the complex frequency domain as $T(s)$, is detected at receiver 2 as $R(s)$, where $$R(s)=H(s)T(s) \tag{1}$$

Equivalently, $$R(s)=H_m(s)H_{ap}(s)T(s) \tag{2}$$

According to this invention, a replica of $H_{ap}(s)T(s)$ is obtained at the receiving station by first passing $R(s)$ through a frequency inverse filter with the characteristics $H_m^{-1}(s)$. Thus $$H_{ap}(s)T(s)=H_m^{-1}(s)R(s) \tag{3}$$

But, an all-pass filter has the property that $$H_{ap}^{-1}(s)=H_{ap}(-s) \tag{4}$$

Hence, if the signal represented in the complex frequency domain by $H_{ap}(s)T(s)$ is compressed in time, and played in reverse, by, for example, being properly stored in a recirculating delay line, then this signal is represented in the complex frequency domain as $$\frac{1}{k}T(-s/k)H_{ap}^{-1}(s/k)$$

where $k$ is a scaling factor. By passing this time-compressed, time-reversed version through a filter with the complex frequency characteristics $kH(s/k)$, the signal $T(-s/k)$ is obtained. If this signal is sampled at the same rate as the input signal is sampled, then the resulting sequence of samples, when appropriately filtered, yields a replica of the original transmitted signal $T(s)$. But for an initial delay, this replica is obtained continuously and in real time.

Detailed description

Figure 3:
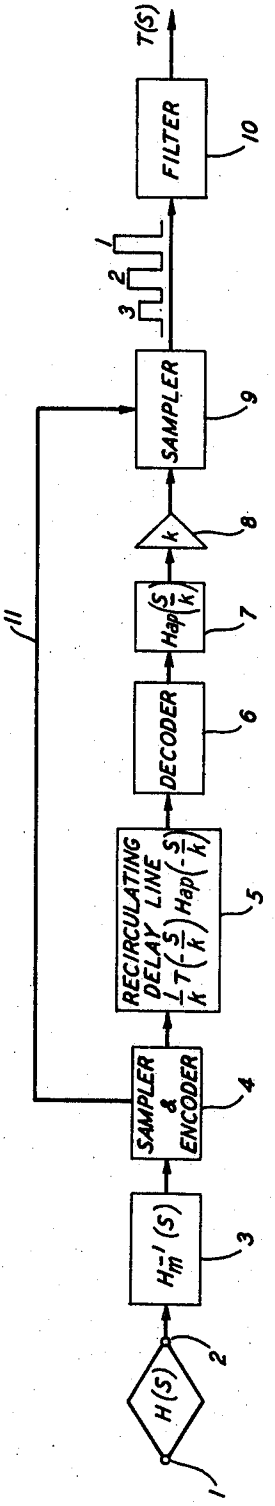
FIG. 3 is a schematic diagram of one embodiment of this invention.

FIG. 3 shows one embodiment of this invention. Transmitter 1 produces a signal $T(s)$. The transmission channel between transmitter 1 and receiver 2 has complex frequency characteristics represented by the product of a minimum phase component $H_m(s)$ and an all-pass component $H_{ap}(s)$. Receiver 2 detects a signal $R(s)$ equal to $T(s)H_m(s)H_{ap}(s)$. $R(s)$ is then passed through filter 3 whose characteristics $H_m^{-1}(s)$ are the frequency inverse of the minimum phase component of the transfer function of the transmission channel. The signal $T(s)H_{ap}(s)$ from filter 3 is sampled and each sample is encoded into an appropriate code word in sampler and encoder 4. A code word representing each coded sample is inserted into recirculating delay line 5 just before the preceding code word inserted into the delay line passes the insertion point.

For example, each code word may comprise a selected number of binary bits. Each bit in a code word is inserted sequentially into recirculating delay line 5 just after the preceding bit in the code word. The last bit in the code word is inserted into the delay line just before the first bit in the code word representing the preceding sample of the signal from filter 3, passes the insertion point.

Figure 4:
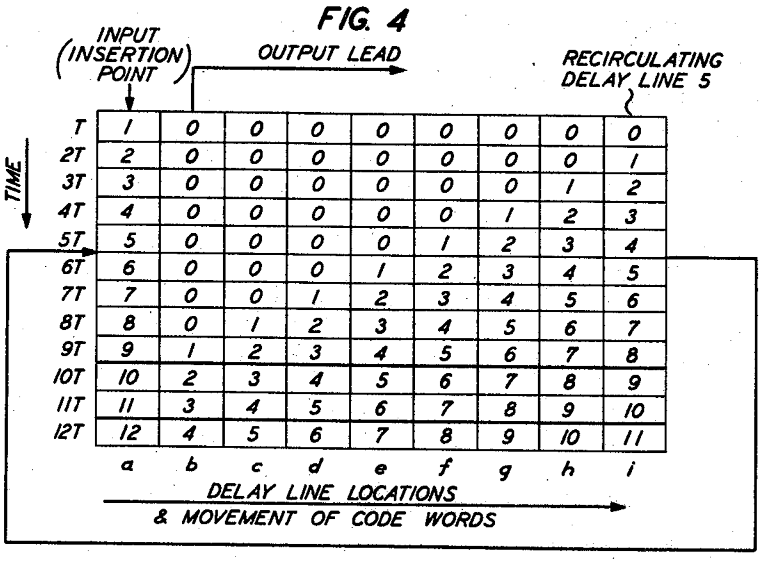
FIG. 4 is of use in explaining the operation of recirculating delay line 5 in the embodiment of FIG. 3.

This is shown in more detail in FIG. 4. FIG. 4 shows schematically the relative locations of the code words stored in the recirculating delay line at the times T, 2T, 3T . . ., that new code words, representing the latest samples of the signal from filter 3, are inserted into the delay line. T represents the sampling interval. Each horizontal row represents the state of the recirculating delay line at a corresponding insertion time. The numbers in each row represent the samples from which the stored code words were derived. The discrete locations of the code words in the recirculating delay line at the insertion times are labeled $a$ through $i$, respectively. Time increases positively in the downward direction as labeled.

Each row corresponds to the state of the delay line at one insertion time. Thus, the code word representing the first sample is inserted into location $a$ of the delay line at time T. At this time, locations $b$ through $i$ are empty, as shown. This code word moves to the right in the delay line until, at time 2T, when the code word representing the second sample is inserted into the delay line, the first code word is at location $i$, just ready to pass location $a$, the insertion point. The code word representing the third sample is inserted into the recirculating delay line at time 3T just before the second code word passes the insertion point for the first time. Assuming, for purposes of this illustration only, that nine code words can be stored in the recirculating delay line, the 9th code word, representing the 9th sample, is inserted into the delay line at time 9T just before the 8th code word passes the insertion point. After the insertion of the 9th code word, the recirculating delay line is full. The 10th code word to be inserted replaces the first code word, thereby updating the information stored in the recirculating delay line. From this time on, the recirculating delay line always contains, in coded form, approximately the last $NT=\tau$ seconds of the received signal, where N is the number of code words, or samples, stored in the recirculating delay line.

The code words representing the last N samples of the output signal from filter 3 (FIG. 3) are continuously and nondestructively read out from the delay line and decoded in decoder 6. Decoder 6, a device well known in the communication arts, converts these code words into an analog signal. This signal, as a result of the arrangement of the code words in the recirculating delay line 5, is a time-compressed, time-reversed analog replica of the last $\tau$ seconds of the output signal from filter 3. This replica, represented in the complex frequency domain as $$\frac{1}{k}T\left(-\frac{s}{k}\right)H_{ap}\left(-\frac{s}{k}\right)$$

or equivalently as $$\frac{1}{k}T\left(-\frac{s}{k}\right)H_{ap}^{-1}\left(\frac{s}{k}\right)$$

is then passed through filter 7, whose characteristics $$H_{ap}\left(\frac{s}{k}\right)$$

are those of a frequency scaled version of the all-pass component of the transfer function of the transmission channel. Amplifier 8 removes the amplitude distortion $1/k$ associated with the time-compressed, time-reversed output signal from filter 7.

Now, in accordance with this invention, a replica of the undistorted input signal $T(s)$ from transmitter 1 is obtained by sampling the output signal from amplifier 8 at the same rate as the output signal from filter 3 is sampled. Sampler 9 does this in response to synchronizing signals sent on lead 11 from sampler and encoder 4.

As shown in FIG. 4, the binary code words at a given location in the recirculating delay line 5 (FIG. 3) at the times new samples are inserted into the delay line, represent the samples from sampler and encoder 4 in just the order in which they were derived, after an initial delay depending on the location. If the code words stored in the delay line are read out from location *b*, for example, a delay time of 8T seconds occurs before any code words are at location *b* at insertion time. The code word representing the first sample then appears at location *b* at time 9T. This code words is read out at time 9T. Thus, the amplitude of the analog signal passed through filter 7 and amplifier 8 at time 9T is determined by this code word. Sampler 9 samples the time-compressed, time-reversed output signal from amplifier 8 at the instant of time its amplitude is given by this code word. Thus the first output sample from sampler 9 is just the first sample from sampler and encoder 4, delayed by 8T seconds.

At the next insertion time, time 10T, when the code word representing the $10^{th}$ sample of the output signal from filter 3 is inserted into the delay line, the second code word to be inserted into the delay line is in location *b*. Thus, sampler 9 yields an output sample whose magnitude is given by this second code word. Likewise, when the $11^{th}$ code word is inserted into the delay line, the third code word inserted into the delay line is in location *b* and the output sample from sampler 9 has a magnitude controlled by this third code word.

Thus, the sequence of samples from sampler 9 represents the undistorted input signal from transmitter 1. This sequence is passed through filter 10 to yield an undistorted replica of the input signal T(*s*).

It should be noticed that the time delay between the production by sampler 9 of samples representing a replica of the input signal to the transmission channel, and the reception by receiver 2 of a distorted version of this input signal, is determined by the location along recirculating delay line 5 at which the recirculating code words are read out. The location at which information is read out is determined, in turn, by the maximum possible amount of information possessed by the input signal to the transmission channel. For example, if the input signal possessing maximum information can be completely represented by four code words—say code words 1, 2, 3, and 4, (FIG. 4)—then these code words can be read out from the delay line 5 at either location *e* or location *f*. This insures that the complete transmitted message included in code words 1, 2, 3, and 4, is contained in the recirculating delay line for the four sampling periods necessary for sampler 9 to produce the samples representing the input signal to the transmission channel. During this period, the time-compressed, time-reversed signal represented by code word 1, 2, 3, and 4, is read out from delay line 5, decoded in decoder 6 (FIG. 3), and passed through filter 7 and amplifier 8, four complete times. Thus, for ideal results, recirculating delay line 5 should hold approximately twice as many code words as necessary to represent the input signal which contains the most information. In addition, these code words should be read out from locations near the middle of the recirculating delay line so that the delay line contains a complete version of the input signal throughout the processing. Of course, other locations along the delay line can also be used as readout points if the possible degration in the quality of the replica of the input signal due to processing incomplete versions of the input signal is acceptable.

In light of this specification, other embodiments will be obvious to those skilled in signal processing. In particular, while this invention has been described in terms of a recirculating delay line, it will be apparent to those skilled in the signal processing arts that shift registers can be used in place of the delay line.

What is claimed is:

1. The method of processing a signal received from a transmission channel characterized by a nonminimum phase transfer function which comprises filtering said signal with a first selected filter to produce a first filtered signal, processing said first filtered signal to develop a time-compressed, time-reversed version of said first filtered signal, filtering said time-compressed, time-reversed version of said first filtered signal with a second selected filter to produce a second filtered signal, and sampling said second filtered signal at selected times to produce a sequence of samples representing the input signal to said transmission channel.

2. The method of claim 1 in which the complex frequency characteristics of said first selected filter are the frequency inverse of those of the minimum phase component of the non-minimum phase transfer function of said transmission channel.

3. The method of claim 1 in which the complex frequency characteristics of said second selected filter are those of a frequency scaled version of the all-pass component of the non-minimum phase transfer function of said transmission channel.

4. The method of processing a signal received from a transmission channel characterized by a non-minimum phase transfer function which comprises filtering said signal with a first selected filter to produce a first filter signal, sampling said first filtered signal at a first selected rate to produce a sequence of samples representing said first filtered signal, encoding said sequence of samples into code words, inserting each of said code words into a recirculating delay line just before the preceding code word to be inserted into said delay line passes the insertion point, to produce a sequence of stored code words representing a time-compressed, time-reversed encoded version of the last $\tau$ seconds of said first filtered signal, reading out said code words continuously and non-destructively from a selected location along said recirculating delay line, decoding said readout code words to produce continuously a time-compressed, time-reversed analog version of the last $\tau$ seconds of said first filtered signal, and sampling said time-compressed, time-reversed analog version at said first selected rate to produce a sequence of samples representing the input signal to said transmission channel.

5. Apparatus for processing a signal received from a transmission channel characterized by a non-minimum phase transfer function, which comprises first means for filtering said signal to produce a first filtered signal, said first means possessing frequency characteristics which are the inverse of the frequency characteristics of the minimum phase component of said non-minimum phase transfer function, means for continuously producing a time-compressed, time-reversed version of the last $\tau$ seconds of said first filtered signal, second means for filtering said time-compressed, time-reversed version to produce a second filtered signal, said second means possessing frequency characteristics identical to those of a frequency scaled version of the all-pass component of said non-minimum phase transfer function, and means for sampling said second filtered signal to produce a first sequence of samples representing the input signal to said transmission channel.

6. Apparatus as in claim 5 including means for producing from said first sequence of samples a replica of said input signal to said transmission channel.

7. Apparatus as in claim 5 wherein said means for continuously producing said version of said first filtered signal includes means for sampling said first filtered signal to produce a second sequence of samples, means for encoding each sample in said second sequence into a corresponding code word, a recirculating delay line, means for producing in said delay line a stored sequence of code words representing said time-compressed, time-reversed version of the last $\tau$ seconds of said first filtered signal, by inserting each code word into said delay line just before the preceding code word to be inserted passes the insertion point, means for continuously and nondestructively reading out said stored sequence of code words from said recirculating delay line, and means for continuously converging said readout code words into a time-compressed, time-reversed version of the last $\tau$ seconds of said first filtered signal.

References Cited

UNITED STATES PATENTS

| | | | |
|---|---|---|---|
| 2,627,574 | 2/1953 | Feldman | 328—164 XR |
| 3,242,462 | 3/1966 | Funk et al. | 328—164 XR |
| 3,341,779 | 9/1967 | Kedson | 328—163 XR |
| 3,356,947 | 12/1967 | Di Toro | 325—65 XR |
| 3,390,336 | 6/1968 | Di Toro | 328—162 XR |
| 3,412,338 | 11/1968 | Bernstein et al. | 328—165 |

DONALD D. FORRER, Primary Examiner

J. ZAZWORSKY, Assistant Examiner

U.S. Cl. X.R.

328—162; 333—70